(12) United States Patent
Shimazawa et al.

(10) Patent No.: US 12,711,985 B1
(45) Date of Patent: Aug. 18, 2026

(54) HEAT ASSISTED MAGNETIC RECORDING HEAD WITH SLIDER AND LASER DIODE

(71) Applicant: Headway Technologies, Inc., Milpitas, CA (US)

(72) Inventors: Koji Shimazawa, Cupertino, CA (US); Dayu Zhou, Fremont, CA (US); Weihao Xu, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 19/302,744

(22) Filed: Aug. 18, 2025

(51) Int. Cl.
*G11B 5/48* (2006.01)
*G11B 5/60* (2006.01)
*G11B 5/00* (2006.01)

(52) U.S. Cl.
CPC .......... *G11B 5/4826* (2013.01); *G11B 5/6088* (2013.01); *G11B 2005/0021* (2013.01)

(58) Field of Classification Search
None
See application file for complete search history.

(56) References Cited

U.S. PATENT DOCUMENTS 4,472,236 A 9/1984 Tanaka et al.
4,877,301 A * 10/1989 Yokomori ............ G11B 7/1359
7,804,655 B2 9/2010 Shimazawa et al.
8,107,192 B2 1/2012 Sasaki et al.
8,116,173 B2 2/2012 Shimazawa et al.
8,149,653 B2 4/2012 Shimazawa et al.
8,240,025 B2 8/2012 Shimazawa et al.
8,248,895 B2 8/2012 Shimazawa et al.
8,248,897 B2 8/2012 Shimazawa et al.
8,325,566 B2 12/2012 Shimazawa et al.
8,406,089 B2 3/2013 Sasaki et al.
8,908,481 B1 12/2014 Miyamoto
9,536,556 B2 1/2017 Hurley et al.
10,943,613 B1 3/2021 Hosoi et al.
2009/0073843 A1* 3/2009 Peng ...................... G02B 6/124 369/94
2011/0235480 A1* 9/2011 Goulakov ............ G11B 5/6088
2013/0279312 A1* 10/2013 Hurley ................. G11B 5/6088 156/60
2014/0241137 A1* 8/2014 Jin ......................... G11B 5/314 29/603.07
2014/0254334 A1* 9/2014 Yang .................... G11B 5/6088 29/603.07

OTHER PUBLICATIONS

Challener, W.A. et al., "Heat-Assisted Magnetic Recording by a Near-Field Transducer with Efficient Optical Energy Transfer", Nature Photonics, vol. 3, pp. 220-224, Apr. 2009.
Wang, X. et al., "HAMR Recording Limitations and Extendibility", IEEE Transactions on Magnetics, vol. 49, No. 2, pp. 686-692, Feb. 2013.

* cited by examiner

*Primary Examiner* — Peter Vincent Agustin
(74) *Attorney, Agent, or Firm* — DLA Piper LLP (US)

(57) ABSTRACT

The present embodiments relate to a heat-assisted magnetic recording (HAMR) head with a cavity configured to receive a laser diode (LD) chip. The inlet coupler layer can extend beyond a dielectric layer such that the dielectric layer is recessed away from a cavity receiving the LD chip, and a distance (G) between the inlet coupler and the LD chip is more easily controlled and modified to improve performance of the head. The dielectric layer can be angled at a first angle, and the inlet coupler, a waveguide, and an overcoat layer can be angled at a second angle and forming a side of the cavity.

20 Claims, 11 Drawing Sheets

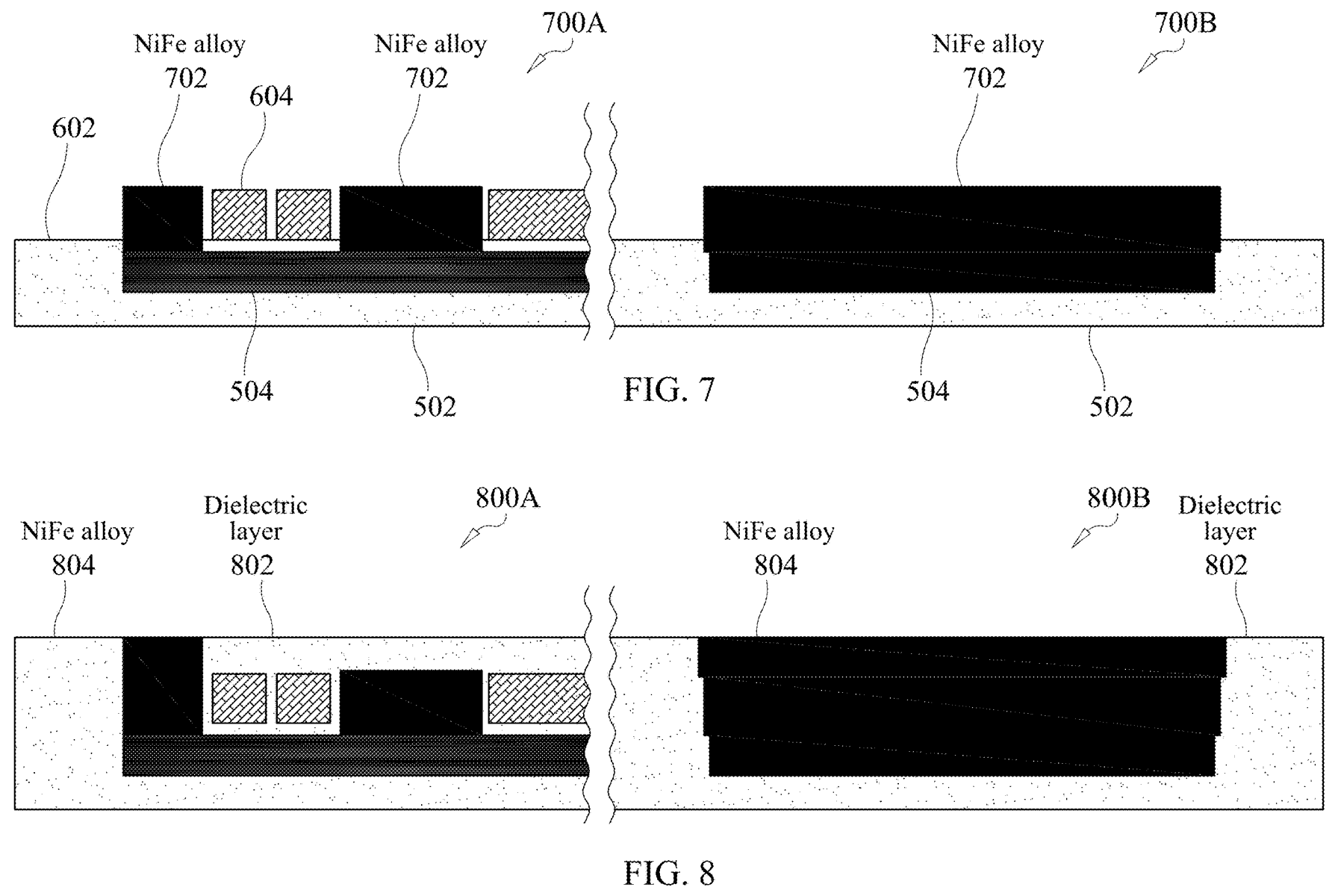

700B

NiFe alloy 702

502

504

700A

NiFe alloy 702

NiFe alloy 702

Dielectric layer 802

800B

NiFe alloy 804

800A

Dielectric layer 802

NiFe alloy 804

FIG. 8

HEAT ASSISTED MAGNETIC RECORDING HEAD WITH SLIDER AND LASER DIODE

TECHNICAL FIELD

Embodiments of the invention relate to the field of electro-mechanical data storage devices. More particularly, embodiments of the invention relate to a heat-assisted magnetic recording (HAMR) head with a cavity with a recessed dielectric layer and configured to receive a laser diode (LD) chip.

BACKGROUND

A magnetic recording medium (e.g., a magnetic disk) can store magnetic bits representing digital data. A magnetoresistive writer can be part of a hard disk drive (HDD) to write digital data to the magnetic recording medium.

As an overall amount of digital data being stored on HDD devices increases, there is an increasing demand for increased data capacity of HDD devices. One technique to increase data capacity for an HDD can include heat-assisted magnetic recording (HAMR) or microwave-assisted magnetic recording (MAMR). HAMR and MAMR techniques increase the density of HDDs by manipulating a portion of the magnetic recording medium, which can enhance write performance of the write head to the magnetic recording medium.

In HAMR recording head, near field surface plasmon resonance on the NFT can be excited by a waveguide and heats the recording medium. While most of the optical energy is coupled to the NFT, there can be some uncoupled optical energy eventually radiating to the recording media as background. This uncoupled light can degrade the confinement of the thermal spot and further cause reduction of the thermal gradient.

SUMMARY

The present embodiments relate to a heat-assisted magnetic recording (HAMR) head with a cavity configured to receive a laser diode (LD) chip. The inlet coupler layer can extend beyond a dielectric layer such that the dielectric layer is recessed away from a cavity receiving the LD chip, and a distance (G) between the inlet coupler and the LD chip is more easily controlled and modified to improve performance of the head. The dielectric layer can be angled at a first angle, and the inlet coupler, a waveguide, and an overcoat layer can be angled at a second angle and forming a side of the cavity.

In a first example embodiment, a heat-assisted magnetic recording (HAMR) head with a cavity configured to receive a laser diode (LD) chip is provided. The HAMR head can include a first dielectric layer and a second dielectric layer disposed over a portion of the first dielectric layer. The second dielectric layer can include a first side and a second side forming a first angle relative to the first dielectric layer.

The HAMR head can also include an inlet coupler layer disposed over the second dielectric layer. The inlet coupler layer can include a first side and a second side, the second side forming a second angle relative to the first dielectric layer. The second side of the inlet coupler layer can extend beyond the second side of the second dielectric layer by a length (L).

The HAMR head can also include a waveguide disposed over the inlet coupler layer and an overcoat layer. A first portion of the overcoat layer can be disposed over the waveguide. The cavity can be configured to receive the LD chip is formed at a first side by the first portion of the overcoat layer, the waveguide, the inlet coupler layer, and the second dielectric layer, and at a second side by a second portion of the overcoat layer.

In some instances, the HAMR head can also include the LD chip disposed in the cavity, wherein a distance between an edge of the LD chip and the second side of the inlet coupler layer is defined by a distance (G).

In some instances, the HAMR head can also include a nozzle disposed on a first side of the LD chip, a first electrode disposed on a second side of the LD chip, and a second electrode disposed on the first dielectric layer.

In some instances, the length L ranges between around 0.5 micrometers to 1 micrometer.

In some instances, a length of the waveguide is less than a length of the inlet coupler layer, and wherein a length of the first portion of the overcoat layer is less than the length of the waveguide.

In some instances, the inlet coupler layer comprises a Silicon Nitride (SiN) material.

In some instances, the HAMR head can also include a bottom return yoke layer disposed at a bottom surface of the HAMR head, the bottom return yoke layer comprising a remaining part of a number of Nickel-Iron (NiFe) alloy layers that are etched via an etching process and chemically stripped via a ferric chloride stripping process.

In some instances, the second dielectric layer comprises a remaining portion of a number of dielectric layers etched as part of an etching process to form the cavity.

In another example embodiment, a method for manufacturing a heat-assisted magnetic recording (HAMR) head with a cavity configured to receive a laser diode (LD) chip is provided. The method can include providing a first dielectric layer. The method can also include disposing a second dielectric layer over a portion of the first dielectric layer.

The method can also include disposing an inlet coupler layer over the second dielectric layer, wherein the inlet coupler layer comprises a first side and a second side. The method can also include disposing a waveguide over the inlet coupler layer. The method can also include disposing an overcoat layer over the waveguide.

The method can also include etching a portion of the second dielectric layer, inlet coupler layer, waveguide, and overcoat layer to form a cavity. The second dielectric layer can include a first side and a second side forming a first angle relative to the first dielectric layer, the second side forming a second angle relative to the first dielectric layer. The second side of the inlet coupler layer can extend beyond the second side of the second dielectric layer by a length (L), a first portion of the overcoat layer disposed over the waveguide. The cavity can be formed at a first side by the first portion of the overcoat layer, the waveguide, the inlet coupler layer, and the second dielectric layer, and at a second side by a second portion of the overcoat layer.

In some instances, the method can further include disposing a first portion of a second dielectric layer over the first dielectric layer. The method can also include disposing a first portion of a Nickel-Iron (NiFe) alloy over the first portion of the second dielectric layer. The method can also include forming a second portion of the second dielectric layer over the first portion of the NiFe alloy such that part of the first portion of the NiFe alloy is exposed.

The method can also include disposing a coil over the second portion of the second dielectric layer. The method can also include forming a second portion of the NiFe alloy over the first portion of the NiFe alloy via a plating process.

The method can also include disposing a third portion of the second dielectric layer such that part of the second portion of the NiFe alloy is exposed. The method can also include forming a second portion of the second dielectric layer over the first portion of the NiFe alloy such that part of the first portion of the NiFe alloy is exposed.

The method can also include forming a third portion of the NiFe alloy over the second portion of the NiFe alloy via a plating process, wherein a first portion of the NiFe alloy and the second dielectric layer are etched to form the cavity. The method can also include performing a chemical stripping process to remove a second portion of the NiFe alloy, wherein a remaining portion of the NiFe alloy comprising a bottom yoke return layer.

In some instances, the method can further include disposing the LD chip in the cavity, wherein a distance between an edge of the LD chip and the second side of the inlet coupler layer is defined by a distance (G).

In some instances, the method can further include disposing a nozzle on a first side of the LD chip, disposing a first electrode on a second side of the LD chip, and disposing a second electrode on the first dielectric layer.

In some instances, length L ranges between around 0.5 micrometers to 1 micrometer.

In some instances, a length of the waveguide is less than a length of the inlet coupler layer, and wherein a length of the first portion of the overcoat layer is less than the length of the waveguide.

In another example, a head gimbal assembly is provided. The head gimbal assembly can include a recording head including a slider and a device connected to the slider.

The device can include a first dielectric layer, and a second dielectric layer disposed over a portion of the first dielectric layer. The device can also include an inlet coupler layer disposed over the second dielectric layer, wherein the second dielectric layer is recessed relative to the inlet coupler layer. The device can also include a waveguide disposed over the inlet coupler layer. The device can also include an overcoat layer, with a first portion of the overcoat layer disposed over the waveguide, wherein a cavity is formed in the device by any of first dielectric layer, the second dielectric layer, the inlet coupler layer, the waveguide, and the overcoat layer.

The head gimbal assembly can also include a load beam connected to the recording head and a suspension connected to the load beam and configured to support the recording head.

In some instances, the device can further include a laser diode (LD) chip disposed in the cavity, wherein a distance between an edge of the LD chip and the second side of the inlet coupler layer is defined by a distance (G), a nozzle disposed on a first side of the LD chip, a first electrode disposed on a second side of the LD chip, and a second electrode disposed on the first dielectric layer.

In some instances, length L ranges between around 0.5 micrometers to 1 micrometer.

In some instances, the device also includes a bottom return yoke layer disposed at a bottom surface of the device, the bottom return yoke layer comprising a remaining part of a number of Nickel-Iron (NiFe) alloy layers that are etched via an etching process and chemically stripped via a ferric chloride stripping process, and wherein the second dielectric layer comprises a remaining portion of a number of dielectric layers etched as part of an etching process to form the cavity.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which:

FIG. 7 illustrates a cross-section view at a line A-B near an ABS and at line C-D where the LD chip is mounted after a third process step, in accordance with some embodiments.

FIG. 8 illustrates a cross-section view at a line A-B near an ABS and at line C-D where the LD chip is mounted after a fourth process step, in accordance with some embodiments.

DETAILED DESCRIPTION

Figure 1:
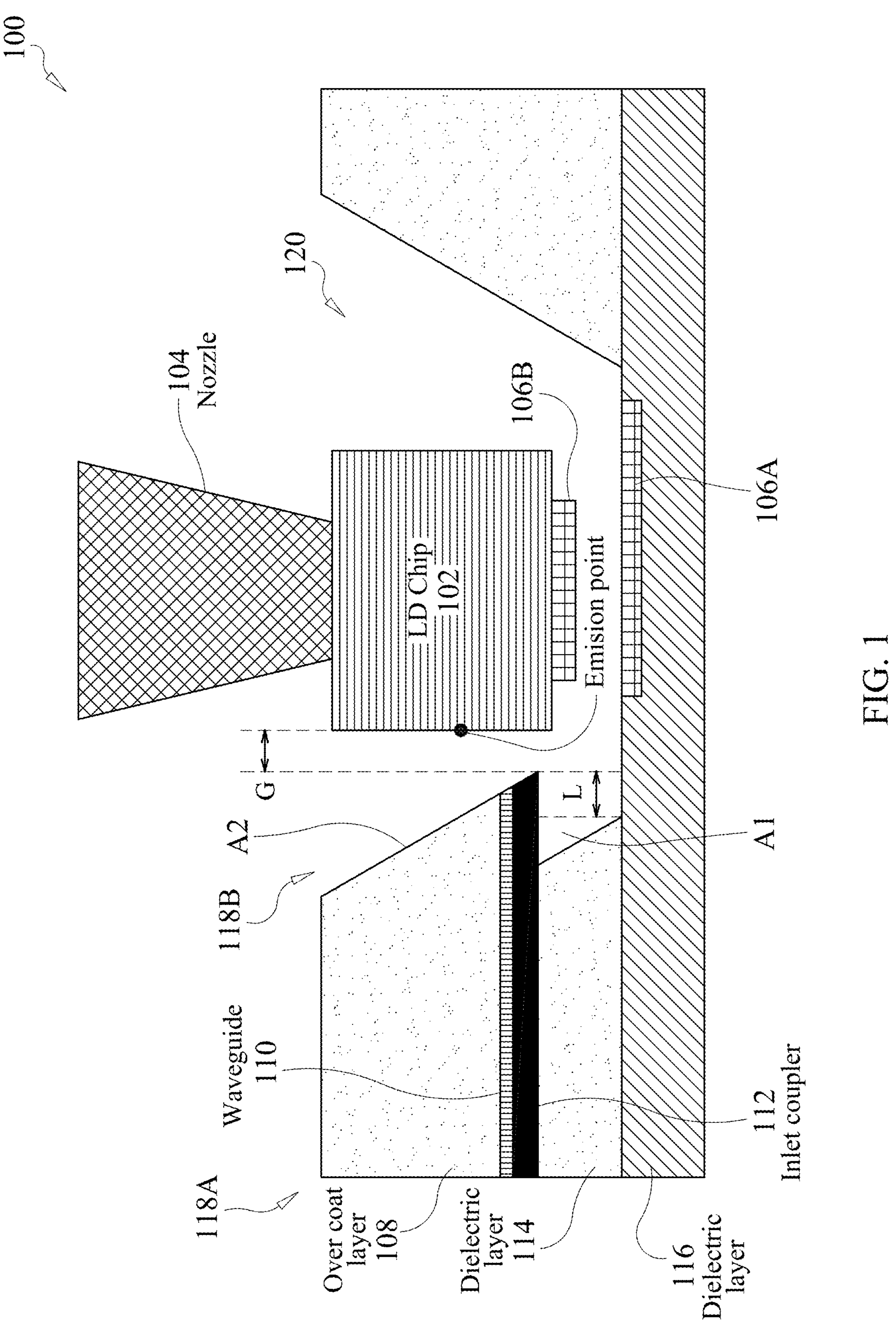
FIG. 1 illustrates a cross-section view of an example LD and cavity built in a slider, in accordance with some embodiments.

A disk drive can include a write head to interact with a magnetic recording medium to read and write digital data to the magnetic recording medium. As the amount of digital data is required to be stored increases and with an increase in data aerial density of hard disk drive (HDD) writing, both the write head and digital data written to the magnetic recording medium can generally be made smaller.

Heat-assisted magnetic recording (HAMR) is a magnetic recording technology that can enable recording at 1~10 Tb/inch$^2$ data density. Utilizing the temperature dependence of the coercivity, HAMR can convert optical power into localized heating in a magnetic recording medium to temporarily reduce the switching field needed to align the magnetizations of the medium grains. Sharp thermal gradients which translate into high magnetic gradients can enable a higher data storage density than achievable with many magnetic recording technologies. Since the heat spot size may be much smaller than the diffraction limit of light, plasmonic structures, also known as near field transducers (NFT), can be used to deliver the desired confinement of the optical heating.

Increasing the magnetic recording areal density may require a smaller grain size in the magnetic recording media, which may reduce storage lifetime. In order to maintain durable storage lifetime, the thermal stability can be increased. In consequence, the magnetic field generated by magnetic writer main pole as well as the current from the coil around the main pole may not be strong enough to switch the magnetic media bits for data recording.

To solve this magnetic recording dilemma, heat-assisted magnetic recording (HAMR) can be implemented. HAMR heads can use heat energy to reduce the energy barrier of the grains of the magnetic recording media while writing the data with magnetic recording field. In many HAMR designs, the heating source can include a near-field light. The near-field light can be generated from plasmons excited by irradiation with light through a metal layer. In HAMR, a laser beam from through the waveguide a laser diode can be used as the irradiation source.

The HAMR head can include a laser diode (LD) that serves as the light source that can be mounted on a slider. One of the difficulties mounting the LD can be the highly accurate alignment of the LD's light-emitting point with the waveguide inlet inside the slider. In such designs, the laser is operated, and the optical output of the waveguide outlet can be monitored while alignment is performed, which is called active alignment. The equipment can be large and complicated. Another problem with this structure is that HAMR head can have three components: a slider, the LD, and the LD sub-mount.

In many HAMR designs, a structure that allows LD to be mounted directly on the slider without using LD sub-mount can be used. This structure can contribute to reducing the resources used to manufacture the HAMR head. In this structure, instead of using active alignment, passive alignment that relies only on the dimensional accuracy of the components can be used. For example, with regard to the alignment in the thickness direction of the LD chip, the thickness of the slider can be designed to match the distance between the bottom of LD and the light-emitting point. Alignment can be generally performed using image recognition technology using a CCD camera.

Various methods can be used to control the distance between the bottom of LD and the light-emitting point without a CCD camera. For instance, a chip, loosely held by a holding jig with suction adhesion, can adjust its position to a zero state when pressed against a surface with an appropriate load. Similarly, if an element loosely held by the suction of a nozzle, is brought into contact with another element and an appropriate load is applied, the element can be repositioned to the zero state, and any desired length can be obtained by moving the element away by a desired distance.

However, in such designs, the side walls of the cavity in the slider facing the LD front facet may be depicted as vertical, but it actually can have an angled slope. For example, when a cavity is formed by reactive-ion etching (RIE) or ion-beam etching (IBE), the hole can narrow as it gets deeper. The angle can fluctuate, and the z position in the zero state can also fluctuate, so the actual distance can fluctuate. In many LD chips, there are horns that can be generated during the chip cleavage process. Different LD chips can have different horn lengths. This can cause fluctuations in the estimated distance value and also cause a problem of contamination due to sliding down when colliding with the side of the cavity.

Another example design can have a laser diode chip with a bottom surface of the laser diode chip, the light emitting point of an active layer, a p-contact layer, an n-current blocking layer, and a p-clad layer. Each of these layers can have its own role, and a certain thickness can be necessary to achieve various performance parameters. As a result, it can be difficult to make the distance between the bottom surface and the light emitting point less than 3 micrometers (um).

Table 1 below depicts an example relationship between distance (G) and an optical coupling efficiency.

TABLE 1

| G [um] | Coupling Efficiency [%] |
|---|---|
| 0.3 | 84.25 |
| 0.8 | 81.04 |
| 1 | 79.43 |
| 1.4 | 75.37 |
| 2.1 | 68.30 |

According to these results, it can be preferable to control G to 1.0 um or less, and the target dimension can be 0.5 um as the average value. Even without the load-positioning as described in some cases, there can be challenges to maintain G at around 0.5 nanometers (nm).

The present embodiments generally relate to a slider with a laser diode chip and a dielectric layer under an inlet coupler on a substrate side and comprising a concave shape. In HAMR head with a cavity capable of accommodating an edge emission type LD chip, the sidewall of the cavity facing the front facet of LD chip can have a stepped shape, and the waveguide or the inlet coupler can protrude from the sidewall. At least a portion of the dielectric layer located under the inlet coupler of the side wall can be recessed by 0.5 um or more with respect to the inlet coupler layer. The present embodiments can also provide methods or systems that can apply a load to LD chip against an inlet coupler to find a zero state and can then adjust the distance (G).

In many designs, simply adopting various slider structures can make it difficult to accurately control the distance between the LD emission point and the waveguide inlet (G), which is an important design parameter, when applied to actual processes and materials. When the structure as described herein is implemented, the distance G can be precisely controlled to a very small value. As a result, the performance of the HAMR head can be greatly improved.

FIG. 1 illustrates a cross-section view of an example LD and cavity built in a slider 100. As shown in FIG. 1, the slider 100 can include an LD chip 102 in a cavity 120. Cavity 120 can have sidewalls defined by an overcoat layer 108 disposed over the waveguide 110, and an inlet coupler 112 disposed between the waveguide 110 and a first dielectric layer 114. A second dielectric layer 116 can be disposed adjacent to the first dielectric layer 114 and can form a bottom surface of the cavity 120. A first electrode 106A can be disposed at the second dielectric layer 116, and a second electrode 106B on a surface of the LD chip 102.

The overcoat layer 108, waveguide 110, and inlet coupler 112 can include a first side 118A and a second side 118B, with a first angle at the second side 118B. Further, the first dielectric layer can comprise a second angle at a second side similar to that of the first angle. A distance between a tip at the second side of the inlet coupler and a tip at a second side of the first dielectric layer can be defined as length "L."

Further, the first dielectric layer 114 can form an angle at the second side 118B relative to the second dielectric layer 116, defined by A1. Angle A1 can be around 45 degrees or range from around 10 degrees to 80 degrees, for example. The waveguide 110, overcoat layer 108, and the inlet coupler 112 can form angle A2. Angle A2 can be around 45 degrees or range from around 10 degrees to 80 degrees, for example. Angle A1 and A2 can be angled at similar angles.

The LD chip 102 can be disposed in the cavity 120, with a nozzle 104 formed on a first surface of the LD chip. The second electrode 106B can be disposed on a second surface of the LD chip 102. An emission point can be on a third surface of the LD chip facing the waveguide 110. A distance "G" can include a distance between the LD chip and the tip at the second side of the inlet coupler.

A difference between the designs as described herein and other designs is that the dielectric layer at the bottom of the inlet coupler (e.g., the first dielectric layer 114) can be recessed by a distance L. With the recess, if the bottom surface of the LD chip is located below the inlet coupler layer, the actual G can always be zero even if a horn is present. Here, L can be set to be larger than the largest possible value of the horn. That can be about 1.0 micrometers (um). If L is larger than that, contaminants generated during the bar machining process can get in and become difficult to remove in a subsequent cleaning process.

Figure 2:
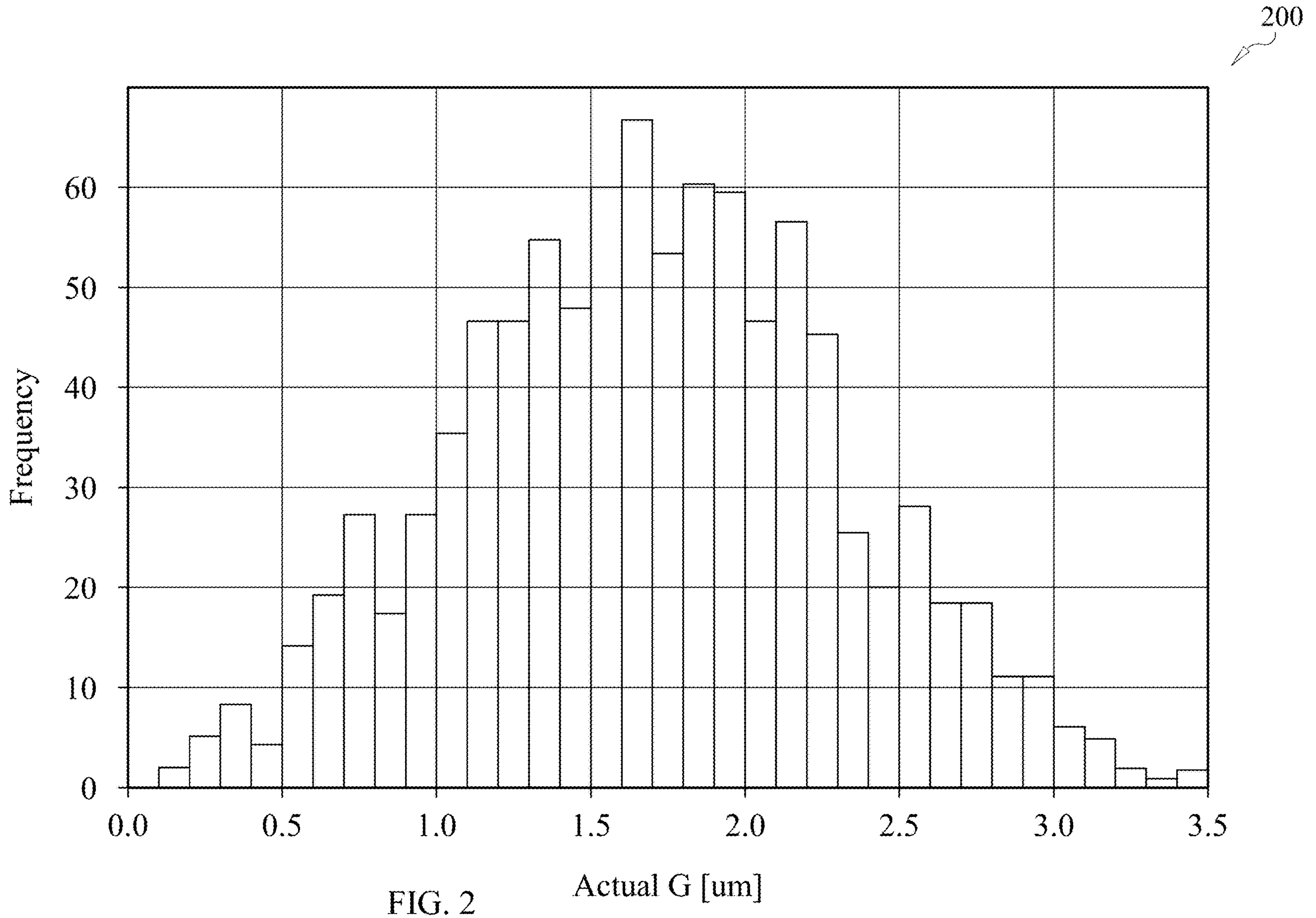
FIG. 2 is a graphical representation of example measurement results of the distance between the LD emission point and the inlet coupler in various designs.

FIG. 2 is a graphical representation 200 of example measurement results of the distance between the LD emission point and the inlet coupler in various designs. This distance can be the actual distance measured by cross-sectional SEM. The LD can be mounted at a position 0.5 urn away from the origin determined by applying a load to the side edge of the cavity wall. Even if there is variation in the nozzle movement accuracy, the variation in G can be around 0.5 nm. The center of the distribution can be shifted to 2.0 urn due to the following two factors: (1) the large variation of the horn, and (2) the slope of the cavity side edge that caused the origin position to be farther away than the waveguide inlet.

Figure 3:
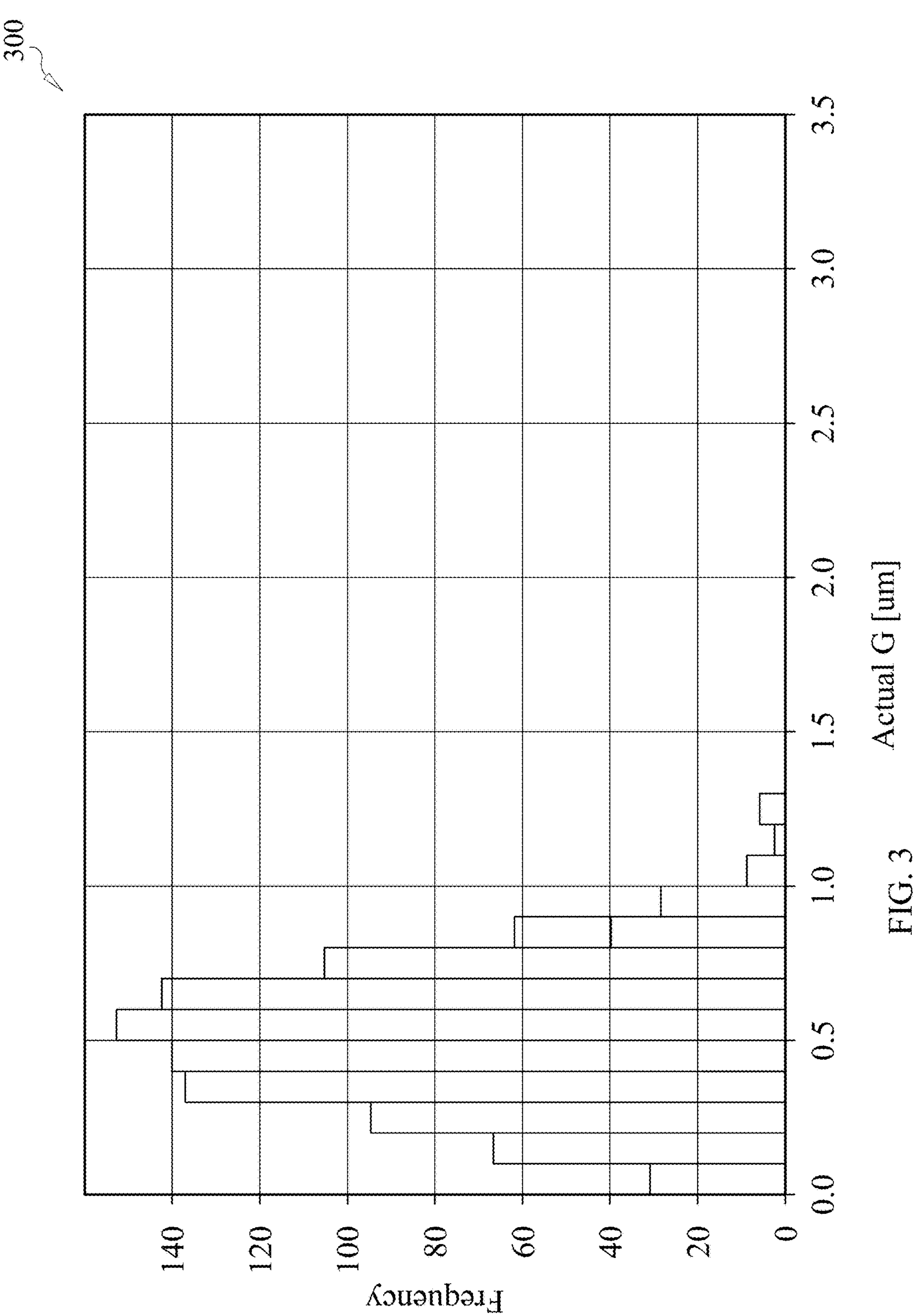
FIG. 3 is a graphical representation of example measurement results of the distance between the LD emission point and the inlet coupler according to the designs as described herein.

FIG. 3 is a graphical representation 300 of example measurement results of the distance between the LD emission point and the inlet coupler according to the designs as described herein. As shown in FIG. 3, in the embodiments as described herein, the influence of the horn can be eliminated and the origin position can be accurately given, so there is no shift from 0.5 um, and the variation is given only by the nozzle movement accuracy.

Figure 4:
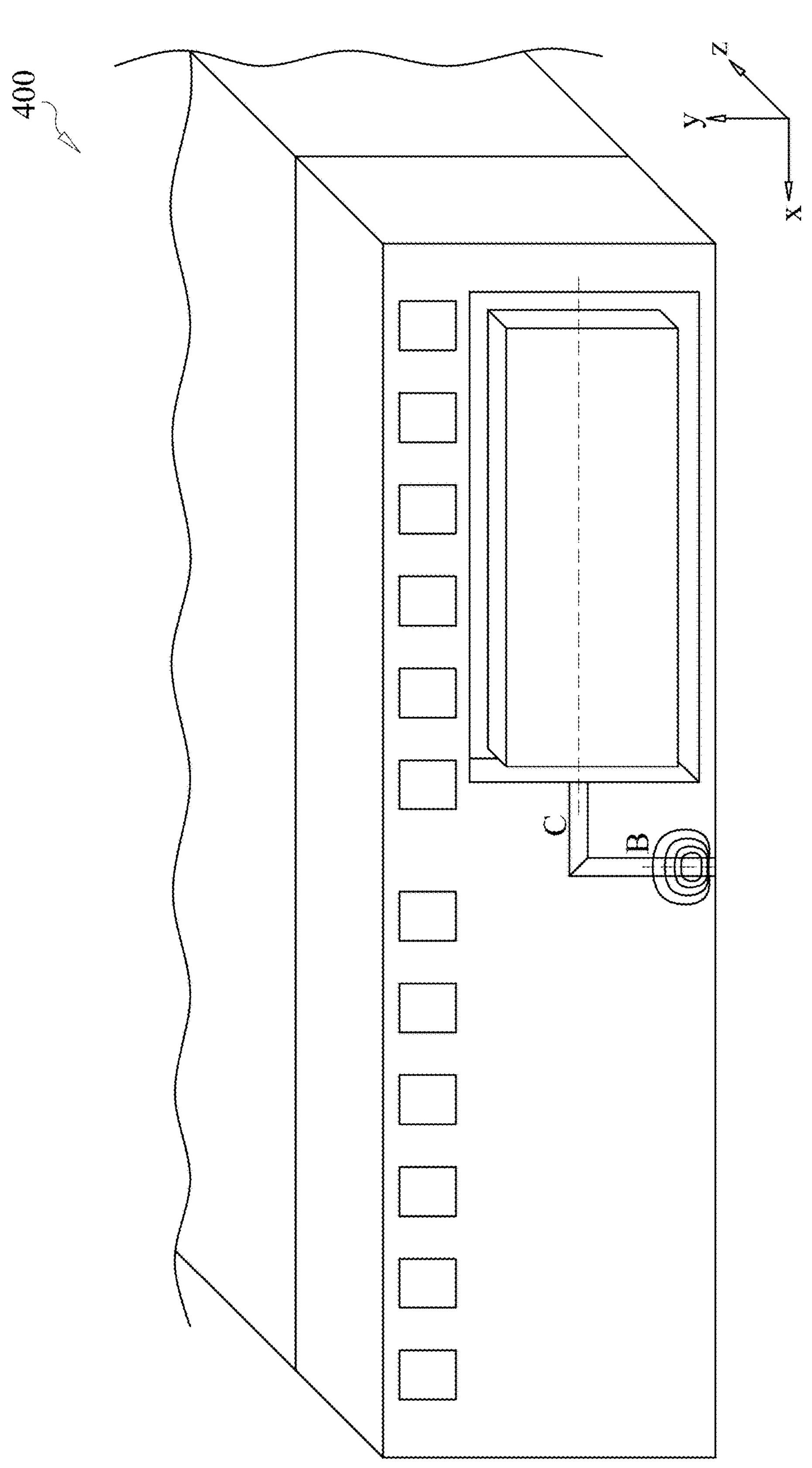
FIG. 4 is an overall view of the HAMR slider, in accordance with some embodiments.

FIG. 4 is an overall view of the HAMR slider 400 as described herein. Further, FIGS. 5-11 illustrate various steps to manufacture the structures as described herein.

Figures 5, 6:
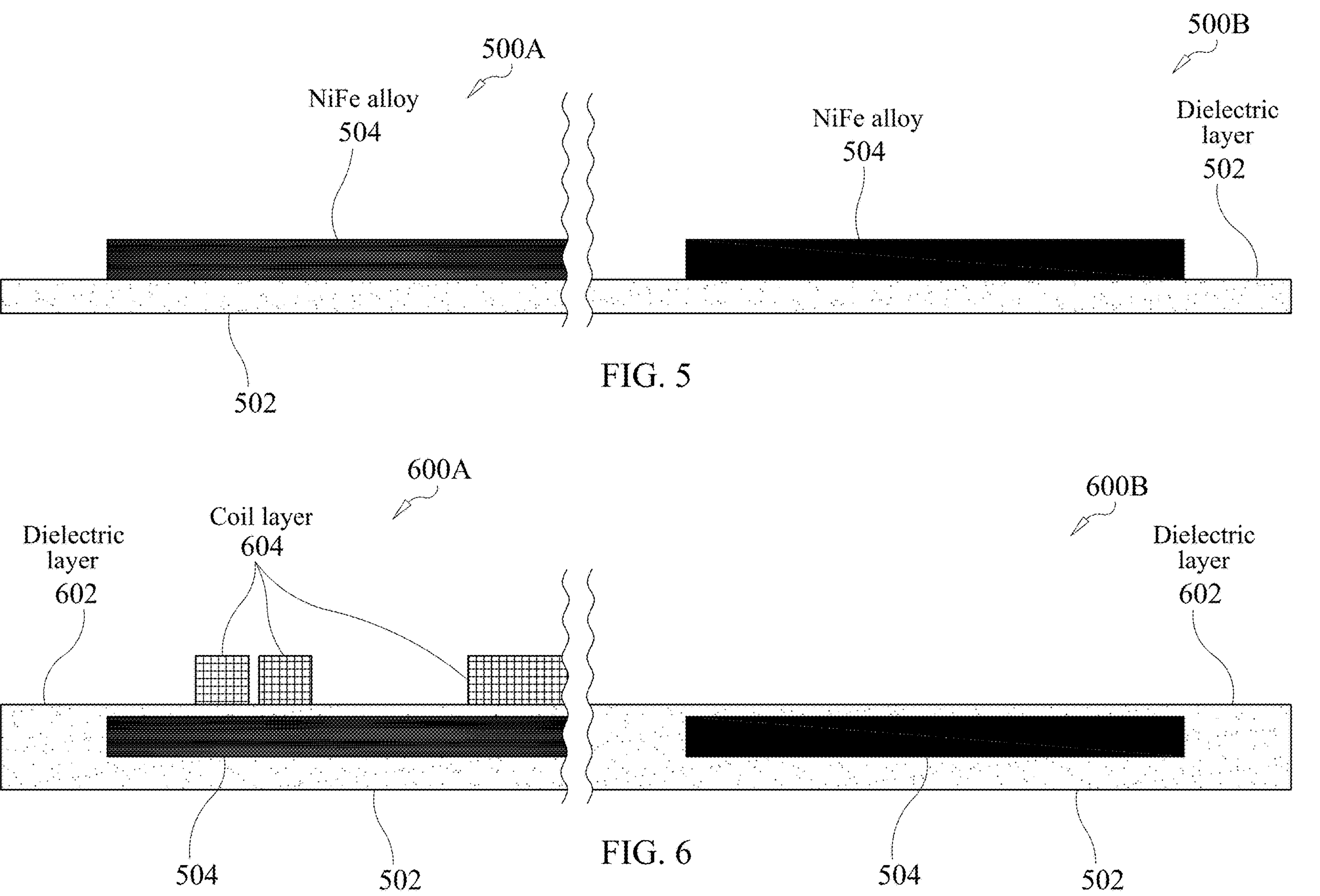
FIG. 5 illustrates a cross-section view at a line A-B near an ABS and at line C-D where the LD chip is mounted after a first process step, in accordance with some embodiments.
FIG. 6 illustrates a cross-section view at a line A-B near an ABS and at line C-D where the LD chip is mounted after a second process step, in accordance with some embodiments.

FIG. 5 illustrates a cross-section view at a line A-B (500A) near an ABS and at line C-D (500B) where the LD chip is mounted after a first process step. As shown in FIG. 5, a Nickel-Iron (NiFe) alloy 504 can be disposed over a dielectric layer 502. This can be the bottom return yoke layer at the bottom of the magnetic writer. At the same time, the NiFe alloy can be plated at line C-D. This can be used as a sacrificial layer in a subsequent process step. The size of the NiFe layer in the x-y plane can be larger than the size of the LD chip to be mounted at a subsequent process step.

FIG. 6 illustrates a cross-section view at a line A-B (600A) near an ABS and at line C-D (600B) where the LD chip is mounted after a second process step. As shown in FIG. 6, a dielectric film 602 can be disposed over the dielectric layer 502 and the NiFe alloy 504. Further, a coil layer 604 can be formed over the dielectric film 602 and the NiFe alloy 504.

After a dielectric film is formed over the entire surface of the wafer, it can be flattened to expose the NiFe alloy layer. The dielectric film can then be applied again. A coil layer comprising a material such as copper (Cu) that functions as coil can be formed by plating only in the line A-B area over the NiFe alloy and the dielectric film.

FIG. 7 illustrates a cross-section view at a line A-B (700A) near an ABS and at line C-D (700B) where the LD chip is mounted after a third process step. As shown in FIG. 7, additional portions of the NiFe alloy 702 can be disposed between portions of the coil layer 604, forming vias to provide electrical connections between the NiFe alloy (e.g., 702, 504) and the coil layer (e.g., 604).

FIG. 8 illustrates a cross-section view at a line A-B (800A) near an ABS and at line C-D (800B) where the LD chip is mounted after a fourth process step. As shown in FIG. 8, another dielectric film (e.g., dielectric layer 802) can be disposed over the wafer. Further, the dielectric layer 802 can be flattened to expose a portion of the NiFe alloy (e.g., 804). In some instances, a third portion of the NiFe alloy can be disposed over the second portion of the NiFe alloy via plating, and another dielectric film can be disposed over the wafer, followed by a planarization process.

Figure 9:
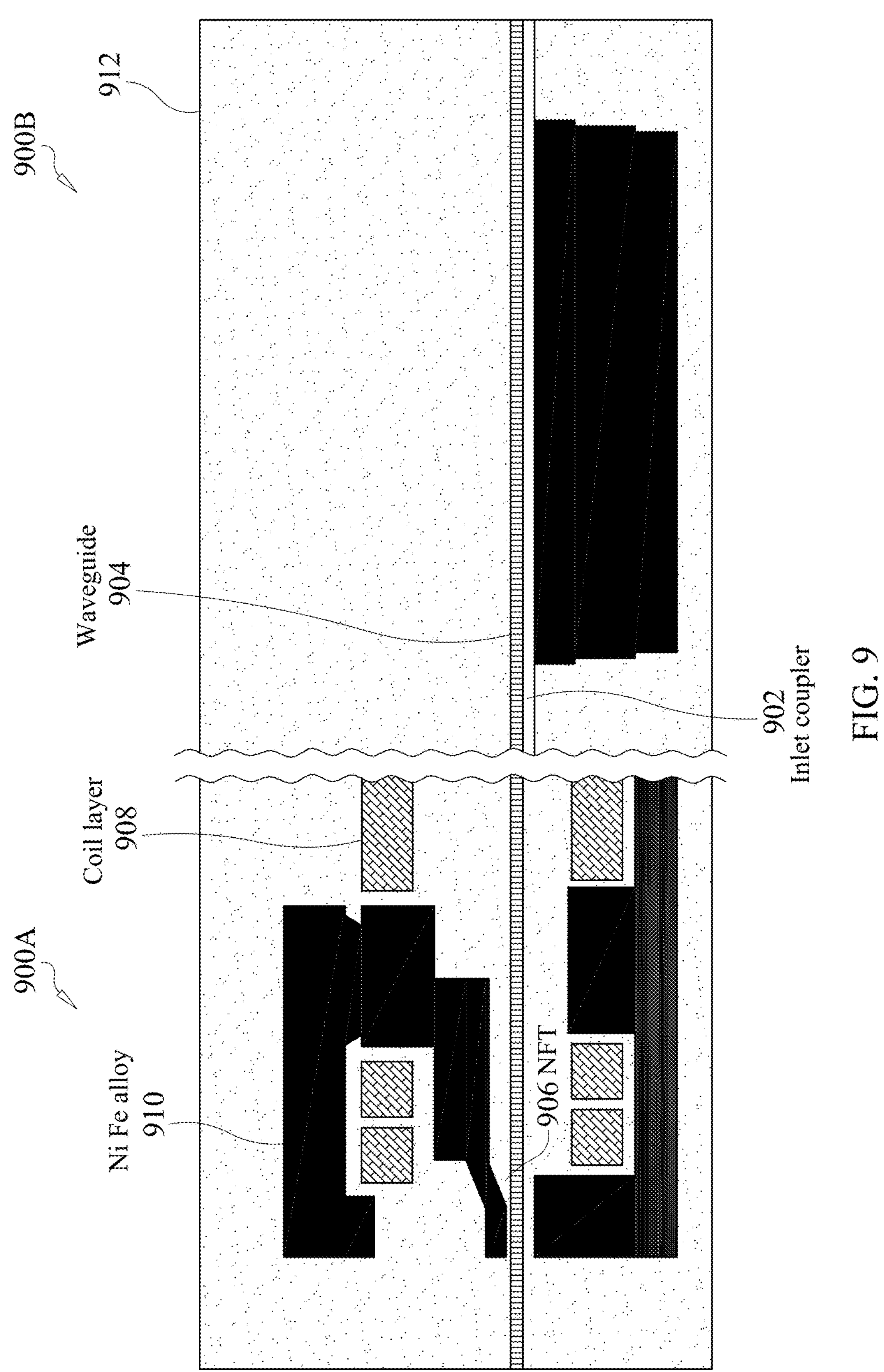
FIG. 9 illustrates a cross-section view at a line A-B near an ABS and at line C-D where the LD chip is mounted after a fifth process step, in accordance with some embodiments.

FIG. 9 illustrates a cross-section view at a line A-B (900A) near an ABS and at line C-D (900B) where the LD chip is mounted after a fifth process step. As shown in FIG. 9, at line C-D, an inlet coupler layer 902 made of a material such as Silicon Nitride (SiN) can be formed. Further, a waveguide layer 904 can be formed and disposed adjacent to the inlet coupler 902.

Further, the remaining elements that make up a HAMR writer such as an NFT 906, main pole, coil 908, top return yoke, NiFe alloy 910, etc., can be fabricated at line A-B. Meanwhile, nothing may be formed at line C-D. Then, overcoat layer 912 and electrode pad layer can be formed to complete the wafer.

Figure 10:
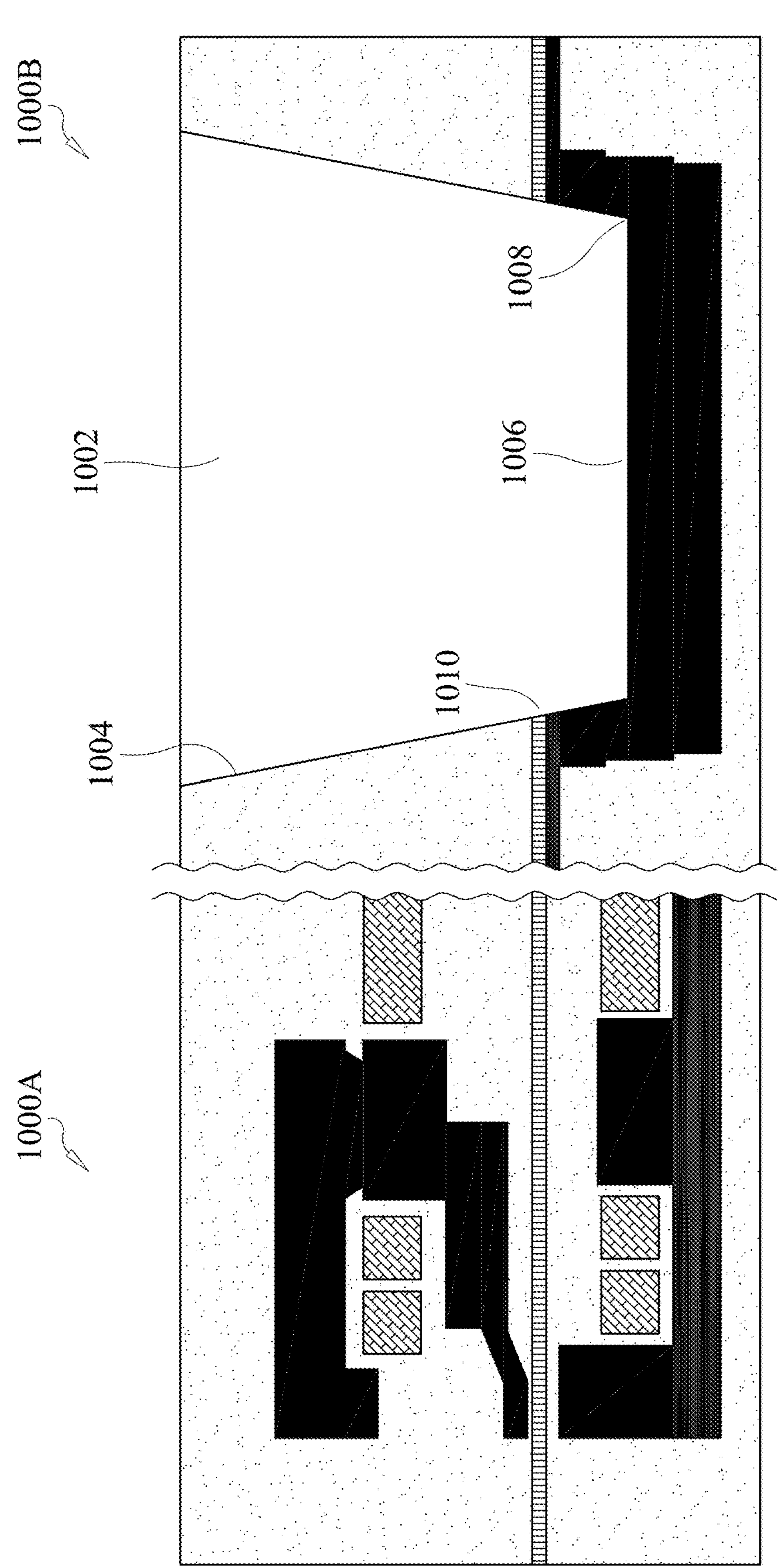
FIG. 10 illustrates a cross-section view at a line A-B near an ABS and at line C-D where the LD chip is mounted after a sixth process step, in accordance with some embodiments.

FIG. 10 illustrates a cross-section view at a line A-B (1000A) near an ABS and at line C-D (1000B) where the LD chip is mounted after a sixth process step. As shown in FIG. 10, a cavity 1002 for placing an LD chip can be formed using techniques such as ion-beam etching (IBE) or reactive-ion etching (RIE) to remove a portion of the overcoat layer 1004 and eth NiFe alloy 1006. This etching can be stopped between the first portion 1008 and the third portion 1010 of the NiFe alloy 1006. This etching can be done in the wafer process or in the backend process after the bar processing is completed.

Figure 11:
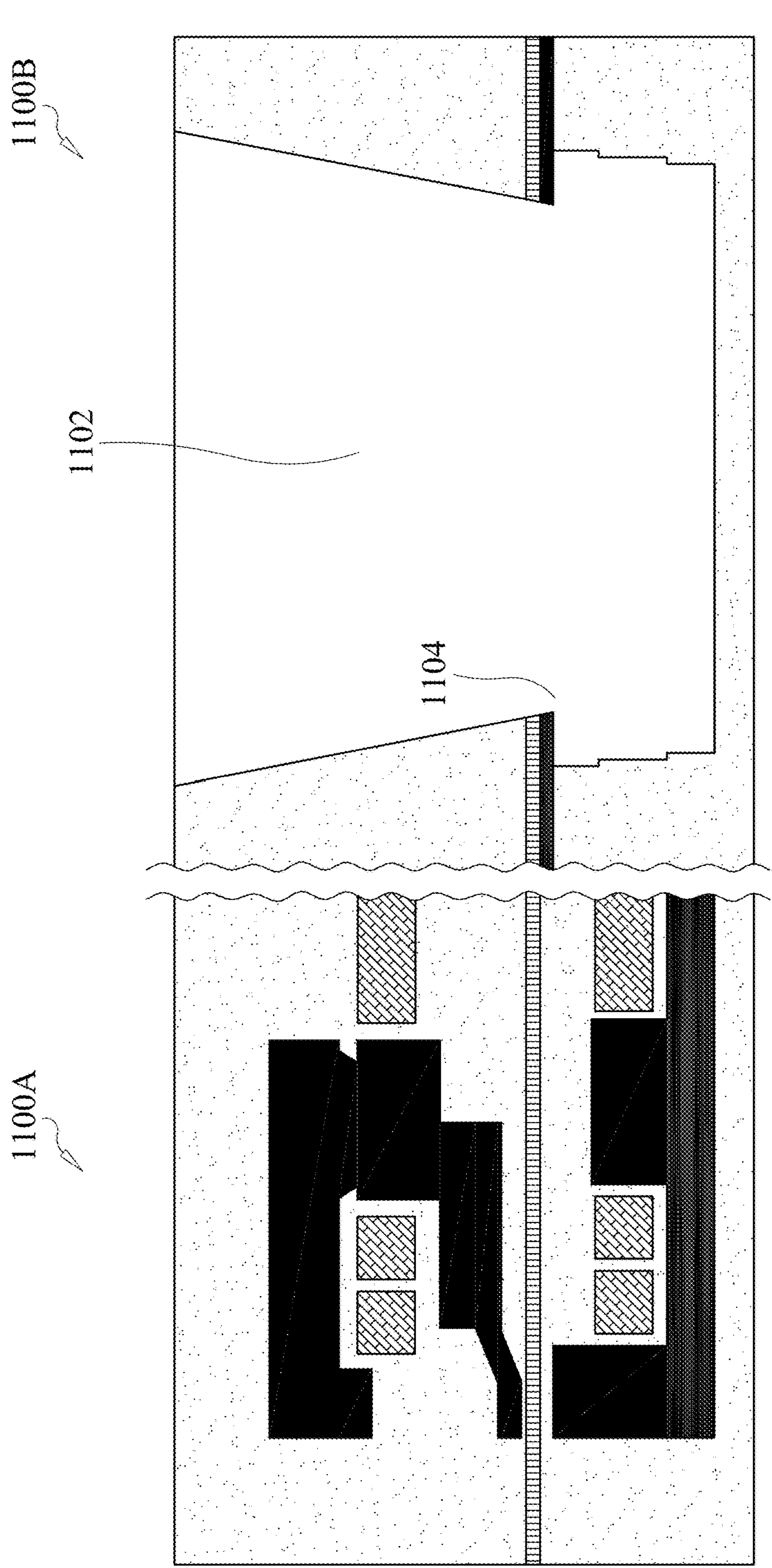
FIG. 11 illustrates a cross-section view at a line A-B near an ABS and at line C-D where the LD chip is mounted after a seventh process step, in accordance with some embodiments.

FIG. 11 illustrates a cross-section view at a line A-B (1100A) near an ABS and at line C-D (1100B) where the LD chip is mounted after a seventh process step. As shown in FIG. 11, part of the NiFe alloy can be chemically stripped using a material such as ferric chloride. The stripping process can leave a remaining part of the NiFe alloy 1104 disposed in the cavity 1102.

Figure 12:
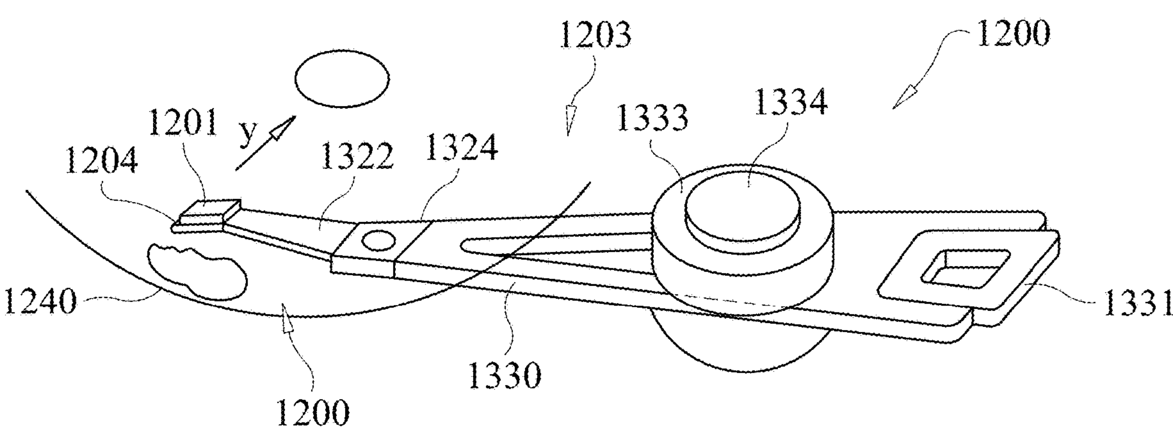
FIG. 12 is a perspective view of an example head gimbal assembly, according to some embodiments.
Figure 13:
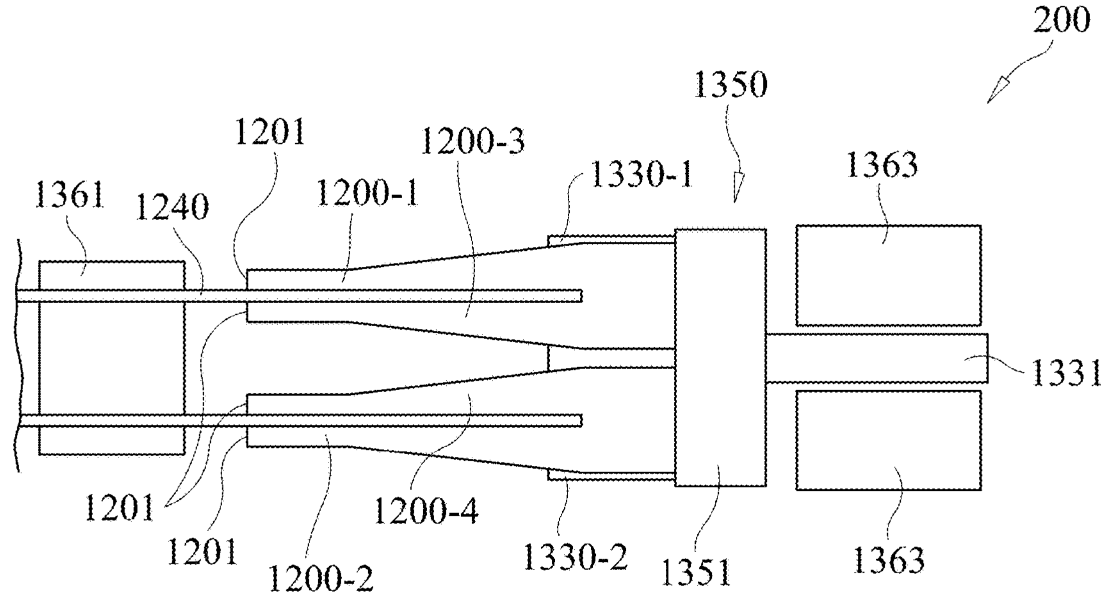
FIG. 13 is side view of an example head stack assembly, according to some embodiments.

The HAMR head as described herein can be part of a hard disk drive (HDD) system. For instance, the HAMR head can include a slider and a write structure as described herein, with a suspension configured to support the HAMR head. FIG. 12 is a perspective view of an example head gimbal assembly 1200, according to some embodiments of the present disclosure. The HAMR head and LD as described herein can be part of an assembly comprising components as described with respect to FIGS. 12-14.

Referring to FIG. 12, a head gimbal assembly (or Head Gimbal Assembly (HGA)) 1200 includes a magnetic recording head 1201 comprised of a slider and a PMR writer structure formed thereon, and a suspension 1203 that elastically supports the magnetic recording head. The suspension has a plate spring-like load beam 1322 formed with stainless steel, a flexure 1204 provided at one end portion of the load beam, and a base plate 1324 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 1200 is mounted on an arm 1330 formed in the head gimbal assembly. The arm moves the magnetic recording head 1201 in the cross-track direction y of the magnetic recording medium 1240. One end of the arm is mounted on base plate 1324. A coil 1331 that is a portion of a voice coil motor is mounted on the other end of the arm. A bearing part 1333 is provided in the intermediate portion of arm 1330. The arm is rotatably supported using a shaft 1334 mounted to the bearing part 1333. The arm 1330 and the voice coil motor that drives the arm configure an actuator.

Next, a side view 1300 of a head stack assembly (FIG. 13) and a plan view 1400 of a magnetic recording apparatus (FIG. 14) wherein the magnetic recording head 1201 is incorporated are depicted. The head stack assembly 1350 is a member to which a plurality of HGAs (HGA 1200-1 and second HGA 1200-2 are at outer positions while HGA 1200-3 and HGA 1200-4 are at inner positions) is mounted to arms 1330-1, 1330-2, respectively, on carriage 1351. A HGA is mounted on each arm at intervals so as to be aligned in the perpendicular direction (orthogonal to magnetic medium 1240). The coil portion (1231 in FIG. 12) of the voice coil motor is mounted at the opposite side of each arm in carriage 1351. The voice coil motor has a permanent magnet 1363 arranged at an opposite position across the coil 1331.

Figure 14:
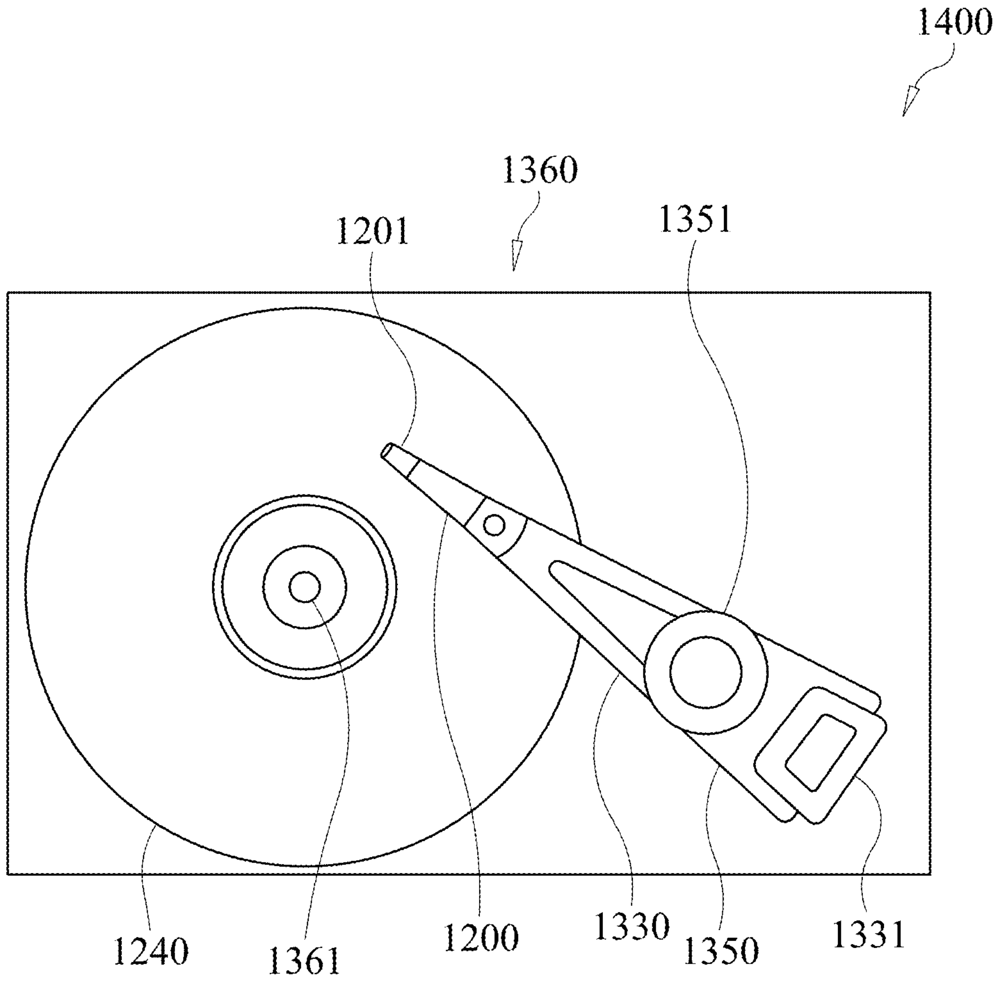
FIG. 14 is a plan view of an example magnetic recording apparatus, according to some embodiments.

With reference to FIG. 14, the head stack assembly 1350 is incorporated in a magnetic recording apparatus 1360. The magnetic recording apparatus has a plurality of magnetic media 1240 mounted to spindle motor 1361. For every magnetic recording medium, there are two magnetic recording heads arranged opposite one another across the magnetic recording medium. The head stack assembly and actuator except for the magnetic recording heads 1201 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magneto-resistive (MR) sensor element (not shown).

In a first example embodiment, a heat-assisted magnetic recording (HAMR) head with a cavity configured to receive a laser diode (LD) chip is provided. The HAMR head can include a first dielectric layer and a second dielectric layer disposed over a portion of the first dielectric layer. The second dielectric layer can include a first side and a second side forming a first angle relative to the first dielectric layer.

The HAMR head can also include an inlet coupler layer disposed over the second dielectric layer. The inlet coupler layer can include a first side and a second side, the second side forming a second angle relative to the first dielectric layer. The second side of the inlet coupler layer can extend beyond the second side of the second dielectric layer by a length (L).

The HAMR head can also include a waveguide disposed over the inlet coupler layer and an overcoat layer. A first portion of the overcoat layer can be disposed over the waveguide. The cavity can be configured to receive the LD chip is formed at a first side by the first portion of the overcoat layer, the waveguide, the inlet coupler layer, and the second dielectric layer, and at a second side by a second portion of the overcoat layer.

In some instances, the HAMR head can also include the LD chip disposed in the cavity, wherein a distance between an edge of the LD chip and the second side of the inlet coupler layer is defined by a distance (G).

In some instances, the HAMR head can also include a nozzle disposed on a first side of the LD chip, a first electrode disposed on a second side of the LD chip, and a second electrode disposed on the first dielectric layer.

In some instances, the length L ranges between around 0.5 micrometers to 1 micrometer.

In some instances, a length of the waveguide is less than a length of the inlet coupler layer, and wherein a length of the first portion of the overcoat layer is less than the length of the waveguide.

In some instances, the inlet coupler layer comprises a Silicon Nitride (SiN) material.

In some instances, the HAMR head can also include a bottom return yoke layer disposed at a bottom surface of the HAMR head, the bottom return yoke layer comprising a remaining part of a number of Nickel-Iron (NiFe) alloy layers that are etched via an etching process and chemically stripped via a ferric chloride stripping process.

In some instances, the second dielectric layer comprises a remaining portion of a number of dielectric layers etched as part of an etching process to form the cavity.

In another example embodiment, a method for manufacturing a heat-assisted magnetic recording (HAMR) head with a cavity configured to receive a laser diode (LD) chip is provided. The method can include providing a first dielectric layer. The method can also include disposing a second dielectric layer over a portion of the first dielectric layer.

The method can also include disposing an inlet coupler layer over the second dielectric layer, wherein the inlet coupler layer comprises a first side and a second side. The method can also include disposing a waveguide over the inlet coupler layer. The method can also include disposing an overcoat layer over the waveguide.

The method can also include etching a portion of the second dielectric layer, inlet coupler layer, waveguide, and overcoat layer to form a cavity. The second dielectric layer can include a first side and a second side forming a first angle relative to the first dielectric layer, the second side forming a second angle relative to the first dielectric layer. The second side of the inlet coupler layer can extend beyond the second side of the second dielectric layer by a length (L), a first portion of the overcoat layer disposed over the waveguide. The cavity can be formed at a first side by the first portion of the overcoat layer, the waveguide, the inlet coupler layer, and the second dielectric layer, and at a second side by a second portion of the overcoat layer.

In some instances, the method can further include disposing a first portion of a second dielectric layer over the first dielectric layer. The method can also include disposing a first portion of a Nickel-Iron (NiFe) alloy over the first portion of the second dielectric layer. The method can also include forming a second portion of the second dielectric layer over the first portion of the NiFe alloy such that part of the first portion of the NiFe alloy is exposed.

The method can also include disposing a coil over the second portion of the second dielectric layer. The method can also include forming a second portion of the NiFe alloy over the first portion of the NiFe alloy via a plating process. The method can also include disposing a third portion of the second dielectric layer such that part of the second portion of the NiFe alloy is exposed. The method can also include forming a second portion of the second dielectric layer over the first portion of the NiFe alloy such that part of the first portion of the NiFe alloy is exposed.

The method can also include forming a third portion of the NiFe alloy over the second portion of the NiFe alloy via a plating process, wherein a first portion of the NiFe alloy and the second dielectric layer are etched to form the cavity. The method can also include performing a chemical stripping process to remove a second portion of the NiFe alloy, wherein a remaining portion of the NiFe alloy comprising a bottom yoke return layer.

In some instances, the method can further include disposing the LD chip in the cavity, wherein a distance between an edge of the LD chip and the second side of the inlet coupler layer is defined by a distance (G).

In some instances, the method can further include disposing a nozzle on a first side of the LD chip, disposing a first electrode on a second side of the LD chip, and disposing a second electrode on the first dielectric layer.

In some instances, length L ranges between around 0.5 micrometers to 1 micrometer.

In some instances, a length of the waveguide is less than a length of the inlet coupler layer, and wherein a length of the first portion of the overcoat layer is less than the length of the waveguide.

In another example embodiment, a device is provided. The device can include a first dielectric layer and a second dielectric layer disposed over a portion of the first dielectric layer, The device can also include an inlet coupler layer disposed over the second dielectric layer, wherein the second dielectric layer is recessed relative to the inlet coupler layer. The device can also include a waveguide disposed over the inlet coupler layer. The device can also include an overcoat layer, with a first portion of the overcoat layer disposed over the waveguide, wherein a cavity is formed in the device by any of first dielectric layer, the second dielectric layer, the inlet coupler layer, the waveguide, and the overcoat layer.

In some instances, the second dielectric layer comprises a first side and a second side forming a first angle relative to the first dielectric layer, and wherein the inlet coupler layer comprises a first side and a second side, the second side forming a second angle relative to the first dielectric layer, and wherein the second side of the inlet coupler layer extends beyond the second side of the second dielectric layer by a length (L).

In some instances, the cavity is formed at a first side by the first portion of the overcoat layer, the waveguide, the inlet coupler layer, and the second dielectric layer, and at a second side by a second portion of the overcoat layer.

In some instances, the device can further include a laser diode (LD) chip disposed in the cavity, wherein a distance between an edge of the LD chip and the second side of the inlet coupler layer is defined by a distance (G), a nozzle disposed on a first side of the LD chip, a first electrode disposed on a second side of the LD chip, and a second electrode disposed on the first dielectric layer.

In some instances, length L ranges between around 0.5 micrometers to 1 micrometer.

In some instances, the device also includes a bottom return yoke layer disposed at a bottom surface of the device, the bottom return yoke layer comprising a remaining part of a number of Nickel-Iron (NiFe) alloy layers that are etched via an etching process and chemically stripped via a ferric chloride stripping process, and wherein the second dielectric layer comprises a remaining portion of a number of dielectric layers etched as part of an etching process to form the cavity.

It will be understood that terms such as “top,” “bottom,” “above,” “below,” and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term “present invention” as used herein should not be construed to mean that only a single invention having a single essential element or group of elements is presented. Similarly, it will also be appreciated that the term “present invention” encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A heat-assisted magnetic recording (HAMR) head with a cavity configured to receive a laser diode (LD) chip, the HAMR head comprising:

a first dielectric layer;

a second dielectric layer disposed over a portion of the first dielectric layer, the second dielectric layer comprising a first side and a second side forming a first angle relative to the first dielectric layer;

an inlet coupler layer disposed over the second dielectric layer, wherein the inlet coupler layer comprises a first side and a second side, the second side forming a second angle relative to the first dielectric layer, and wherein the second side of the inlet coupler layer extends beyond the second side of the second dielectric layer by a length (L);

a waveguide disposed over the inlet coupler layer; and an overcoat layer, with a first portion of the overcoat layer disposed over the waveguide, wherein the cavity configured to receive the LD chip is formed at a first side by the first portion of the overcoat layer, the waveguide, the inlet coupler layer, and the second dielectric layer, and at a second side by a second portion of the overcoat layer.

2. The HAMR head of claim 1, further comprising the LD chip disposed in the cavity, wherein a distance between an edge of the LD chip and the second side of the inlet coupler layer is defined by a distance (G).

3. The HAMR head of claim 2, further comprising:
a nozzle disposed on a first side of the LD chip;
a first electrode disposed on a second side of the LD chip; and
a second electrode disposed on the first dielectric layer.

4. The HAMR head of claim 1, wherein length L ranges between around 0.5 micrometers to 1 micrometer.

5. The HAMR head of claim 1, wherein a length of the waveguide is less than a length of the inlet coupler layer, and wherein a length of the first portion of the overcoat layer is less than the length of the waveguide.

6. The HAMR head of claim 1, wherein the inlet coupler layer comprises a Silicon Nitride (SiN) material.

7. The HAMR head of claim 6, further comprising:
a bottom return yoke layer disposed at a bottom surface of the HAMR head, the bottom return yoke layer comprising a remaining part of a number of Nickel-Iron (NiFe) alloy layers that are etched via an etching process and chemically stripped via a ferric chloride stripping process.

8. The HAMR head of claim 6, wherein the second dielectric layer comprises a remaining portion of a number of dielectric layers etched as part of an etching process to form the cavity.

9. The HAMR head of claim 1, wherein the HAMR head is part of a head gimbal assembly, wherein the HAMR head is connected to a slider and a load beam, wherein the load beam is connected to a suspension configured to support the HAMR head and the slider.

10. A method for manufacturing a heat-assisted magnetic recording (HAMR) head with a cavity configured to receive a laser diode (LD) chip, the method comprising:
providing a first dielectric layer;
disposing a second dielectric layer over a portion of the first dielectric layer;
disposing an inlet coupler layer over the second dielectric layer, wherein the inlet coupler layer comprises a first side and a second side;
disposing a waveguide over the inlet coupler layer;
disposing an overcoat layer over the waveguide; and
etching a portion of the second dielectric layer, inlet coupler layer, waveguide, and overcoat layer to form a cavity, the second dielectric layer comprising a first side and a second side forming a first angle relative to the first dielectric layer, the second side forming a second angle relative to the first dielectric layer, and wherein the second side of the inlet coupler layer extends beyond the second side of the second dielectric layer by a length (L), a first portion of the overcoat layer disposed over the waveguide, and wherein the cavity is formed at a first side by the first portion of the overcoat layer, the waveguide, the inlet coupler layer, and the second dielectric layer, and at a second side by a second portion of the overcoat layer.

11. The method of claim 10, further comprising:
disposing a first portion of a second dielectric layer over the first dielectric layer;
disposing a first portion of a Nickel-Iron (NiFe) alloy over the first portion of the second dielectric layer;
forming a second portion of the second dielectric layer over the first portion of the NiFe alloy such that part of the first portion of the NiFe alloy is exposed;
disposing a coil over the second portion of the second dielectric layer;
forming a second portion of the NiFe alloy over the first portion of the NiFe alloy via a plating process;
disposing a third portion of the second dielectric layer such that part of the second portion of the NiFe alloy is exposed;
forming a second portion of the second dielectric layer over the first portion of the NiFe alloy such that part of the first portion of the NiFe alloy is exposed;
forming a third portion of the NiFe alloy over the second portion of the NiFe alloy via a plating process, wherein a first portion of the NiFe alloy and the second dielectric layer are etched to form the cavity; and
performing a chemical stripping process to remove a second portion of the NiFe alloy, wherein a remaining portion of the NiFe alloy comprising a bottom yoke return layer.

12. The method of claim 10, further comprising:
disposing the LD chip in the cavity, wherein a distance between an edge of the LD chip and the second side of the inlet coupler layer is defined by a distance (G).

13. The method of claim 10, further comprising:
disposing a nozzle on a first side of the LD chip;
disposing a first electrode on a second side of the LD chip; and
disposing a second electrode on the first dielectric layer.

14. The method of claim 10, wherein length L ranges between around 0.5 micrometers to 1 micrometer.

15. The method of claim 10, wherein a length of the waveguide is less than a length of the inlet coupler layer, and wherein a length of the first portion of the overcoat layer is less than the length of the waveguide.

16. A head gimbal assembly comprising:
a recording head including a slider and a device connected to the slider, the device including:
a first dielectric layer;
a second dielectric layer disposed over a portion of the first dielectric layer;
an inlet coupler layer disposed over the second dielectric layer, wherein the second dielectric layer is recessed relative to the inlet coupler layer;
a waveguide disposed over the inlet coupler layer; and
an overcoat layer, with a first portion of the overcoat layer disposed over the waveguide, wherein a cavity is formed in the device by any of first dielectric layer, the second dielectric layer, the inlet coupler layer, the waveguide, and the overcoat layer;
a load beam connected to the recording head; and
a suspension connected to the load beam and configured to support the recording head.

17. The head gimbal assembly of claim 16, wherein the second dielectric layer of the device comprises a first side and a second side forming a first angle relative to the first dielectric layer, and wherein the inlet coupler layer comprises a first side and a second side, the second side forming a second angle relative to the first dielectric layer, and wherein the second side of the inlet coupler layer extends beyond the second side of the second dielectric layer by a length (L).

18. The head gimbal assembly of claim 16, wherein the cavity is formed at a first side by the first portion of the overcoat layer, the waveguide, the inlet coupler layer, and the second dielectric layer, and at a second side by a second portion of the overcoat layer.

19. The head gimbal assembly of claim 17, further comprising:

a laser diode (LD) chip disposed in the cavity of the device, wherein a distance between an edge of the LD chip and the second side of the inlet coupler layer is defined by a distance (G);

a nozzle disposed on a first side of the LD chip;

a first electrode disposed on a second side of the LD chip; and a second electrode disposed on the first dielectric layer.

20. The head gimbal assembly of claim 16, further comprising:

a bottom return yoke layer disposed at a bottom surface of the device, the bottom return yoke layer comprising a remaining part of a number of Nickel-Iron (NiFe) alloy layers that are etched via an etching process and chemically stripped via a ferric chloride stripping process, and wherein the second dielectric layer comprises a remaining portion of a number of dielectric layers etched as part of an etching process to form the cavity.

* * * * *